A. KUDLER.
VENDING APPARATUS.
APPLICATION FILED OCT. 13, 1915.
1,177,041.
Patented Mar. 28, 1916.
3 SHEETS—SHEET 1.
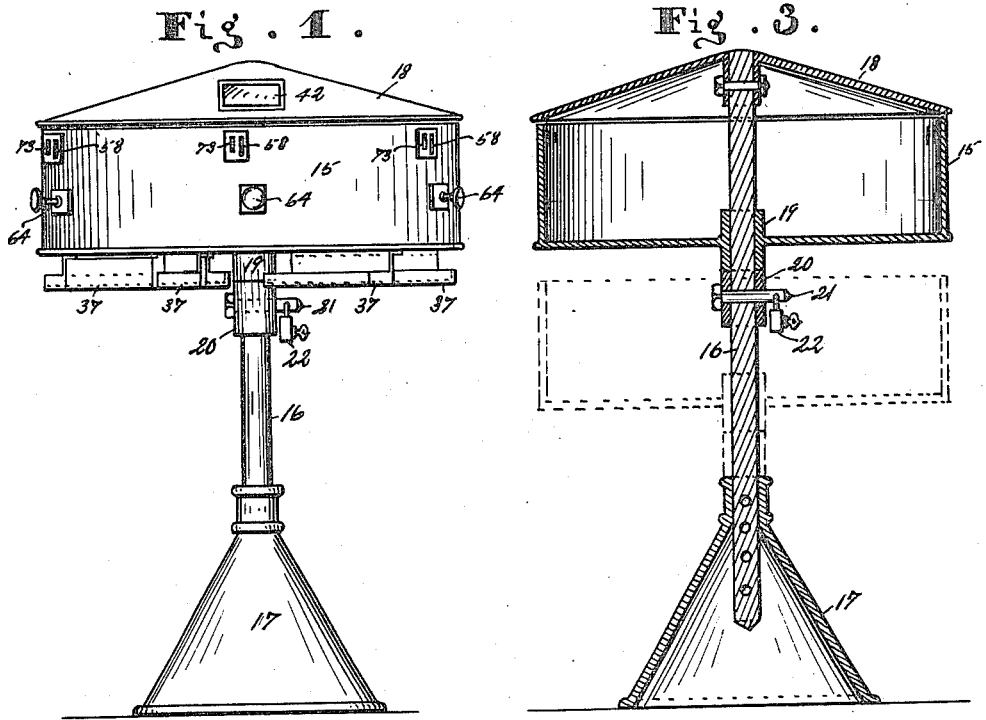
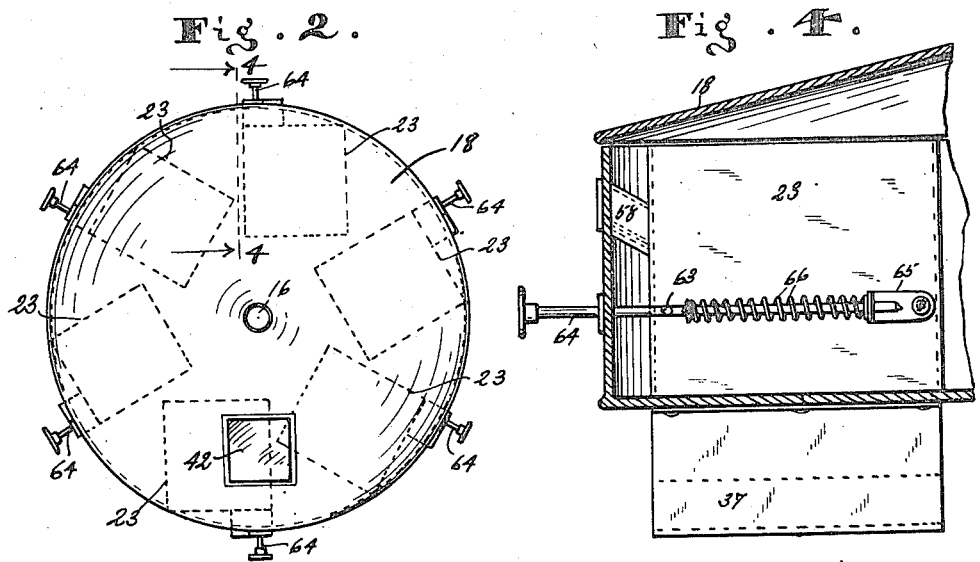
Witness:
W. M. Gentle.
Inventor.
Adolph Kudler
By Alex. H. Lidders
Attorney.

A. KUDLER.
VENDING APPARATUS.
APPLICATION FILED OCT. 13, 1915.

1,177,041.

Patented Mar. 28, 1916.
3 SHEETS—SHEET 2.

Witness;
W. M. Gentle.

Inventor.
Adolph Kudler
By
Alex. H. Liddore
Attorney.

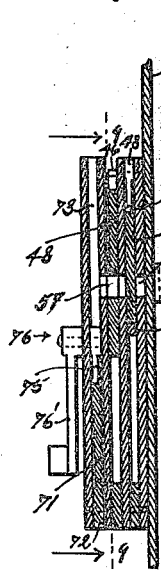

UNITED STATES PATENT OFFICE.

ADOLPH KUDLER, OF LOS ANGELES, CALIFORNIA.

VENDING APPARATUS.

1,177,041.  Specification of Letters Patent.  Patented Mar. 28, 1916.

Application filed October 13, 1915. Serial No. 55,747.

*To all whom it may concern:*

Be it known that I, ADOLPH KUDLER, a subject of the Emperor of Austria-Hungary, residing at Los Angeles, county of Los Angeles, State of California, have invented a certain new and useful Vending Apparatus; and I do hereby declare the following to be a full, clear, and exact description of the invention, such as will enable others skilled in the art to which it appertains to make and use the same.

This invention relates to vending apparatus, more particularly to an improved coin-controlled apparatus for vending cigars and matches; and it may be said to consist in the provision of the novel and advantageous features and in the novel and improved construction, arrangement, and combination of parts and devices as will be apparent from the description and claim which will follow hereinafter.

Objects of the invention are to provide an improved apparatus of the nature specified which is simple in construction, economical to manufacture, install, and maintain, strong and durable, attractive in appearance, easily operated and effective in action.

Other objects and the advantages of the invention will be apparent to those skilled in the art from a careful consideration of the following description of the preferred form of the apparatus, taken in connection with the accompanying drawings in which—

Figure 5:
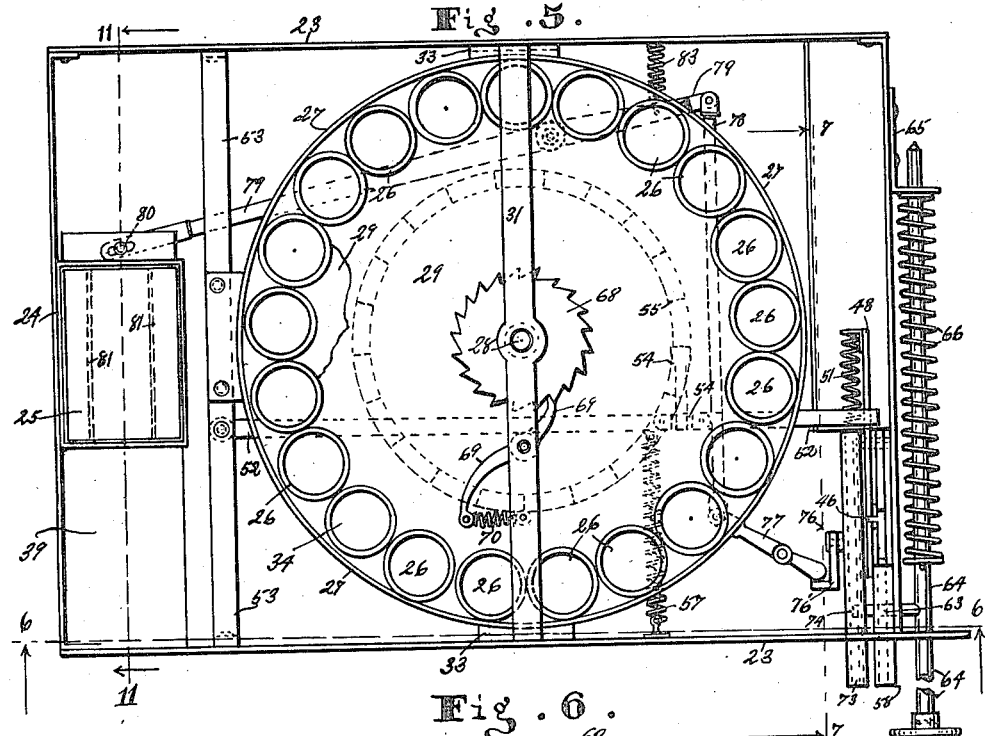
Figure 6:
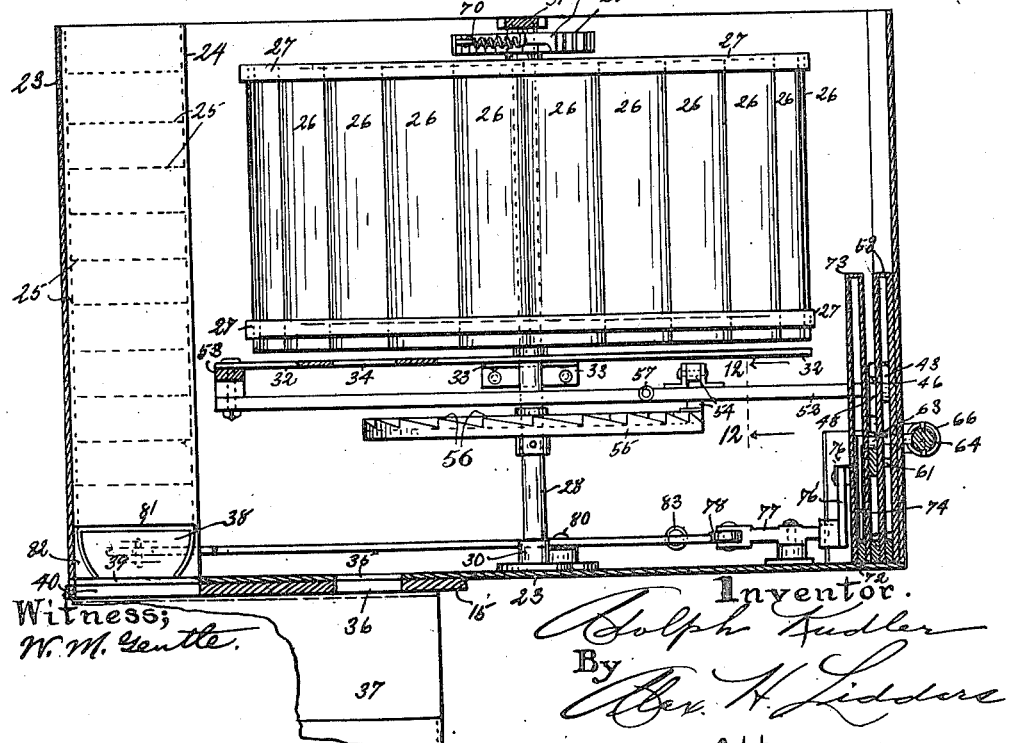

Figure 1 is an elevational view of the apparatus; Fig. 2 is a plan view of the same; Fig. 3 is a sectional view of the magazine casing and stand; Fig. 4 is an enlarged broken sectional view taken on the line 4—4 of Fig. 2; Fig. 5 is an enlarged partly broken plan view of one of the magazines and operating parts; Fig. 6 is a sectional view taken on the line 6—6 of Fig. 5; Fig. 7 is an enlarged broken sectional view taken on the line 7—7 of Fig. 5; Fig. 8 is a sectional view taken on the line 8—8 of Fig. 7; Fig. 9 is a sectional view taken on the line 9—9 of Fig. 8; Fig. 10 is a broken plan view taken on the line 10—10 of Fig. 7; Fig. 11 is a broken sectional view taken on the line 11—11 of Fig. 5; Fig. 12 is an enlarged sectional view taken on the line 12—12 of Fig. 6; Fig. 13 is an enlarged broken view showing a portion of the operating mechanism; and Fig. 14 is an enlarged broken perspective view of a portion of the operating mechanism.

The preferably cylindrical casing 15 is rotatably mounted on a stand consisting of the post 16 which has its lower end secured to the base 17 and has secured to its upper end the top or hood 18 for the casing 15. The bottom of the casing 15 is provided with a bushing 19 which rests on the sleeve 20 which latter is secured in position by means of the pin 21 which passes through the sleeve 20 and post 16 and has arranged thereon the padlock 22. By removing the padlock 22 from the pin 21 and then removing the latter from the bushing 20 the latter and consequently the casing 15 can be moved downwardly on the post 16 to permit access to the interior of the casing 15.

In the casing 15 are arranged a plurality of the magazines 23 each of which is open at the top thereof and has therein the receptacle 24 for boxes of matches 25 and a set of upright cylindrical cigar receptacles 26 which latter are open at both ends and arranged circularly as seen in Fig. 5. In each set of the receptacles 26 the latter are connected together by bands 27 and they are mounted on the rotatable post 28 by means of plates 29 which are connected between the receptacles 26 and the post 28. The latter has its lower end arranged in the bearing 30 on the bottom of the magazine 23 and has its upper end bearing in the crosspiece 31 connected between the sides of the magazine 23. The post 28 passes freely through the stationary plate 32 which is secured to the magazine 23 by the brackets 33 and is arranged under the receptacles 26 and provided with an opening 34. When cigars are placed in the receptacles 26 they bear on the plate 32 but when any one of the receptacles 26 is in alinement with the opening 34 the cigar in such receptacle passes through the opening 34 and through the alined openings 35 and 36 in the bottoms of the magazine 23 and casing 15 and thence into the delivery pan 37 which is suitably mounted on the outer side of the bottom of the casing 15.

The receptacle 24 has at its lower end an opening 38 through which a box of matches can pass to the opening 39 in the bottom of the magazine 23 and thence to the opening 40 in the bottom of the casing 15 and thence to the delivery pan 37. The openings 39 and 40 are in alinement.

The sets of receptacles 26 in the plurality of magazines 23 may contain cigars of different brands and the purchaser can turn the casing 15 to select and effect delivery of a cigar from any one of the magazines 23; the kinds of cigars in the magazines 23 being marked on the casing 15 or seen through the transparent window 42 in the hood 18.

To each of the magazines 23 is connected coin-controlled means which can be operated to effect either simultaneous delivery of a cigar and box of matches or separate delivery of either. The coin-controlled means for effecting delivery of a cigar is constructed as follows: A rocker 43 is mounted on a pivot 44 on one side of the panel 45 in the magazine 23 and is provided with a projection 46 which extends through the slot 47 in the panel 45 and is adapted, when the forward part of the rocker 43 is moved upwardly, to bear against and swing downwardly the forward end portion of the bar 48 which latter is provided with a slot 49 and is slidably mounted on the pin 50 which is mounted on the panel 45 and extends through the slot 49. A spring 51 connected to the rear part of the bar 48 and to the panel 45, normally holds the forward part of the bar 48 in raised position as seen more clearly in Fig. 7. An arm 52 has one of its ends pivotally mounted on the crossbar 53 in the magazine 23, and it has its other free end disposed at the rear of the bar 48. The arm 52 has thereon the pawl 54 which is operatively connected to the ratchet wheel 55 which is mounted fast on the post 28 and has its teeth 56 corresponding in number with that of the receptacles 26. A retractile spring 57 is connected between the arm 52 and one side of the magazine 23. A coin chute 58 extends from the exterior of the casing 15 and into the magazine 23 and it is provided with a slot 59 in the sides thereof and with an opening 60 at the rear of the slot 59. The chute 58 has therein a floor 61 which is arranged below the slot 59 and is inclined upwardly rearwardly so that when a coin 62 of the proper size is dropped down through the chute 58 to the floor 61 and moved rearwardly it moves upwardly the forward end portion of the rocker 43 and causes the projection 46 to move downwardly the forward end portion of the bar 48. The latter when its forward end portion is moved downwardly can be moved rearwardly by means of the projecting part 63 which is provided on the push rod 64 and adapted to engage the forward end of the bar 48. The push rod 64 extends through the casing 15 and passes freely through the bracket 65 on the magazine 23. A retracting spring 66 is interposed between the push rod 64 and the bracket 65, and the projecting part 63 passes through the slots 59 provided in the magazine 23 and the panel 45. When the bar 48 is moved rearwardly the coin 62 is pushed rearwardly and drops into the magazine 23 and the rear end of the bar 48 moves against the arm 52 and thus causes the pawl 54 to actuate the ratchet wheel 55 to turn the post 28 and consequently the receptacles 26 to effect delivery of a cigar from one of the receptacles 26 and through the openings 34, 35 and 36 and into the delivery pan 37. When the push rod 64 is released, it is moved to normal position by the spring 66, and the springs 51 and 57 act to return the bar 48 and the arm 52 to normal position. When the arm 52 is returned to normal position the pawl 54 is moved from its engagement with one tooth to engagement with the next tooth of the ratchet wheel 55. If desired the post 28 may have thereon the ratchet wheel 68, and the crossbar 31 may have thereon the pawl 69 to which is attached the spring 70 for holding the pawl 69 against the ratchet wheel 68 to limit the movement of the receptacles 26 when the push rod 64 is operated. When it is desired to effect delivery of a box of matches 25 a coin 71 of the proper size is allowed to drop to the floor 72 at the lower end of the chute 73 which is disposed at the side of the chute 58. Then the push rod 64 is operated to have the downward extension 74 of the projecting part 63 move the coin 71 rearwardly to engage and move the arm 75 of the bell crank 76 whose other arm 76' is consequently moved against one end of the pivoted lever 77 whose other end is connected by the link 78 to one end of the pivoted arm 79 whose other slotted end is fitted on a pin 80 on the rear end of the hollow form 81 which is adapted to occupy the space of a box of matches at the lower end of the receptacle 24. When the push rod 64 is operated the form 81 is moved rearwardly through the opening 82 in the receptacle 24 and the heap of boxes of matches in the receptacle 24 falls to the bottom of said receptacle. When the push rod 64 is released the spring 66 acts to return the push rod 64 to its normal position, and the spring 83 which is connected between the arm 79 and one side of the magazine 23 acts to move to their normal position the bell crank 76, lever 77, link 78, arm 79, and form 81, and consequently the form 81 is moved into the bottom of the receptacle 24 and ejects therefrom a box of matches which falls through the openings 39 and 40 and thence into the delivery pan 37. The coin 71 drops from the rear end of the floor 72 and into the magazine when the push rod 64 is operated.

The construction which has been particularly illustrated and described admits of minor changes and modifications—wherefore the right is reserved to all such changes and modifications as do not depart from the spirit and scope of the invention which is defined in the appended claim.

I claim:

In vending apparatus, the combination of a rotatably mounted post, a ratchet wheel secured to said post, a chute, an inclined floor therein, a push rod having a projecting part extending into the chute, a pivotally mounted arm, a pawl on said arm operatively connected to said ratchet wheel, a bar for operating said arm, a rocker adapted to move said bar into the path of said projecting part when said push rod is operated to cause said projecting part to move a coin between the inclined floor and the rocker, and retracting springs connected to the arm, bar, and push rod.

In testimony whereof, I have signed my name to this specification at Los Angeles, county of Los Angeles, State of California, this 8th day of October A. D. 1915.

ADOLPH KUDLER.